(12) United States Patent
Grammel (10) Patent No.: US 7,843,851 B2
(45) Date of Patent: Nov. 30, 2010

(54) METHOD AND CONTROL PLANE FOR PROVISIONING CONNECTIONS IN A MULTI-LAYER TRANSPORT NETWORK

(75) Inventor: Gert Grammel, Ditzingen (DE)

(73) Assignee: Alcatel, Paris (FR)

( * ) Notice: Subject to any disclaimer, the term of this patent is extended or adjusted under 35 U.S.C. 154(b) by 756 days.

(21) Appl. No.: 11/485,327

(22) Filed: Jul. 13, 2006

(65) Prior Publication Data

US 2007/0038734 A1    Feb. 15, 2007

(30) Foreign Application Priority Data

Aug. 15, 2005   (EP)   .................................. 05291730

(51) Int. Cl.
*H04L 12/28* (2006.01)

(52) U.S. Cl. ...................................... 370/254

(58) Field of Classification Search ................ 370/254, 370/258, 351, 369, 400, 465, 480; 709/223, 709/238–242

See application file for complete search history.

(56) References Cited

U.S. PATENT DOCUMENTS

| | | | |
|---|---|---|---|
| 6,606,303 B1 * | 8/2003 | Hassel et al. | 370/238 |
| 7,161,910 B2 * | 1/2007 | Maeno | 370/258 |
| 7,301,911 B2 * | 11/2007 | Mack-Crane et al. | 370/254 |
| 7,366,112 B2 * | 4/2008 | Ishibashi | 370/255 |

2003/0172362 A1    9/2003   Mack-Crane

OTHER PUBLICATIONS

De Maesschalck S et al: "Circuit/wavelength switching and routing report of the achievements of the cost-action 266." Telecommunications, 2003. vol. 2, Jun. 2003, pp. 769-773, XP010646991.

Tomic S: "Issues of resource management in two-layer GMPLS networks with virtual network services." Global Telecommunications Conference, 2004. vol. 3, Nov. 2004, pp. 1803-1807, XP010757829.

* cited by examiner

*Primary Examiner*—Dmitry H Levitan
(74) *Attorney, Agent, or Firm*—Carmen Patti Law Group, LLC (57) ABSTRACT

In a multi-layer transport network, a method and related control plane allow automatic provisioning of a client layer connection (31, 32, 33, 24, 34, 35) over at least one server layer connection (11, 12, 13, 21, 22, 23, 14, 15, 16, 25, 26) by selecting a path through the transport network taking into account free resources of existing server layer connections (14, 15, 16, 25) and additionally taking into account free resources in the transport network, where no server layer connections exist so far. The selection is based on a cost calculation which takes into account a cost value per link and further takes into account an additional cost value for links on which no available server layer connection exist so far. Eventually, the path having the lowest overall cost is selected. Server layer connections (11, 12, 13, 21, 22, 23, 26) on links along said selected path where no server layer connection with free resources exists so far are then established and used to set up the requested client layer (31, 32, 33, 24, 34, 35) connection.

11 Claims, 5 Drawing Sheets

PRIOR ART

METHOD AND CONTROL PLANE FOR PROVISIONING CONNECTIONS IN A MULTI-LAYER TRANSPORT NETWORK

The invention is based on a priority application EP 05291730.9 which is hereby incorporated by reference.

FIELD OF THE INVENTION

The present invention relates to the field of telecommunications and more particularly to a method and related control plane for automatically provisioning connections in a multi-layer transport network.

BACKGROUND OF THE INVENTION

Transport networks are for example networks based on SDH (Synchronous Digital Hierarchy) as defined in ITU-T G.707 12/2003 or OTH (Optical Transport Hierarchy) as defined in ITU-T G.709 03/2003. These ITU-T recommendations are both incorporated by reference herein. Such transport networks have a multi-layer multiplex hierarchy where higher layer transport signals serve for the transport of either tributary signals or lower layer transport signals, which can then transport tributary signals at a lower rate. A higher layer is thus referred to as a server layer and a lower layer as a client layer.

For example in SDH, a transport frame is called STM-N (N=1, 4, 16, 64, or 256) and can transport N entities referred to as virtual containers VC4. A VC4 can either carry a 140 Mbit tributary signal or a number of lower order virtual containers VCn (n=11, 12, 2, 3). Accordingly, a connection utilizing VC4 is in SDH termed a higher order path (HOP) connection and a connection utilizing VCn (n=11, 12, 2, 3) is termed a lower order path (LOP) connection. A HOP is thus a server layer to a LOP as client layer. More generally, a VC4 is also referred to as a higher order VC (HOVC), a term which applies also to the North American SDH equivalent named SONET, i.e. to a SONET VC3 and also to a concatenation of VC4 (or SONET VC3), i.e., VC4-xc, x=4, 16, 64.

In OTH, which is based on wavelength division multiplexing of optical wavelength channels, there exist multiplex entities termed optical channel data units ODUk with k=1, 2, or 3. An ODU1 can be transported in an optical channel OCH with a bandwidth of 2,5 GBit/s or four ODU1 can be multiplexed into an ODU2, which is then transported in an optical channel OCH with a bandwidth of 10 GBit/s. Hence, the ODU2 is a server layer to an ODU1. Moreover, an ODUk can transport an SDH STM-N of suitable size. Therefore, ODUk can be a server layer to STM-N.

While transport networks like SDH and OTH networks are still based on circuit switching technology, routing algorithms are implemented to dynamically setup and release connections as these may be required. Such dynamic connections are well suited for the transport of packet switched traffic such as Ethernet, ATM, or IP. Accordingly, to make the transport networks "data-aware", a new routing protocol termed GMPLS (Generalized Multiprotocol Label Switching) has been defined in the IETF. GMPLS supports not only devices that perform packet switching, but also those that perform switching in the time, wavelength, and space domains. For this purpose, network elements in the transport network are equipped with GMPLS routing extensions, i.e., a distributed control plane composed of GMPLS controllers, which communicate among each other via a dedicated control network (typically an Ethernet) and automatically provision new connections by configuring their respectively associated network elements to switch the respective connection.

However, GMPLS routing mechanisms work only on a single network layer. In a multi-layer transport network, a request for a client layer connection can only be served if server layer connections exist that can be utilized. Extensions towards multi-layer e.g. for Ethernet over SDH are currently under discussion but require complex interactions on control plane level. This creates communication overhead and leads to complex recovery scenarios.

The unpublished European Patent Application 05291164 filed on 30.05.2005, which is incorporated by reference herein, describes a routing method and related network management system, which take into account more than one network layers. However, since in this solution server layer connections are automatically set up to provide client layer connections, the influence the operator can take on the routing in the network is limited and his capabilities of traffic engineering are reduced.

It is therefore an object of the present invention to provide a method and related control plane for automatically provisioning connections in a multi-layer transport network, which creates less overhead and allows to use the network resources more efficiently.

SUMMARY OF THE INVENTION

These and other objects that appear below are achieved by a method and related control plane for automatically provisioning a client layer connection over at least one server layer connection in a multi-layer transport network, by selecting a path through the transport network taking into account free resources of existing server layer connections and additionally taking into account free resources in the transport network, where no server layer connections exist so far. The selection is based on a cost calculation which takes into account a cost value per link and further takes into account an additional cost value for links on which no available server layer connection exist so far. Eventually, the path having the lowest overall cost is selected. Server layer connections on links along said selected path where no server layer connection with free resources exists so far are then established and used to set up the requested client layer connection.

The invention allows to use available bandwidth in a very efficient way shared by different service layers. Moreover, thanks to the new routing mechanism, the available bandwidth can be used in the case of a failure in a flexible way to restore the traffic for each layer. Another advantage is that by simply changing the cost structure, a layered routing can be achieved.

BRIEF DESCRIPTION OF THE DRAWINGS

Preferred embodiments of the present invention will be described below with reference to the accompanying drawings in which.

DETAILED DESCRIPTION OF THE INVENTION

The present invention is based on a specific resource allocation policy within the network which reduces the communication overhead to a minimum. Based on the known "simplistic" single-layer solution, a modification is proposed allowing to more efficiently use the network resources without creating additional control plane overhead.

Figure 1:
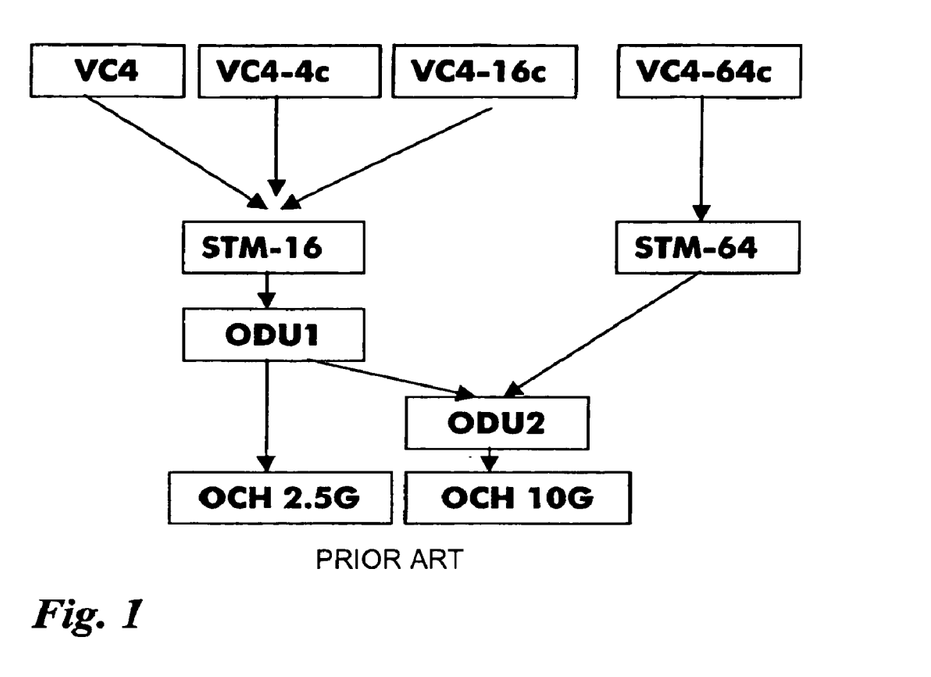
FIG. 1 shows the multiplexing hierarchy used by a multi-layer transport network in the embodiments.

The multiplexing hierarchy that is used in the following embodiments is shown in FIG. 1. The basic transport technology is an OTH optical channel OCH at either 2,5 GBit/s or 10 GBit/s. An OCH at 2,5 GBit/s can transport a ODU1, while an OCH at 10 GBit/s transports an ODU2. An ODU2 can carry up to four ODU1 or directly an SDH signal composed of STM-64 frames. An ODU1 in turn can carry a signal built from STM-16 frames. An STM-16 frame can carry up to 16 VC4, four contiguous concatenations VC4-4c, or one contiguous concatenation VC4-16c. An STM-64 can carry a concatenation VC4-64c. Obviously, an STM-64 can alternatively carry 64 individual VC4 or a suitable combination of smaller concatenations of VC4s, but which is not preferred in the below embodiments.

Figure 2:
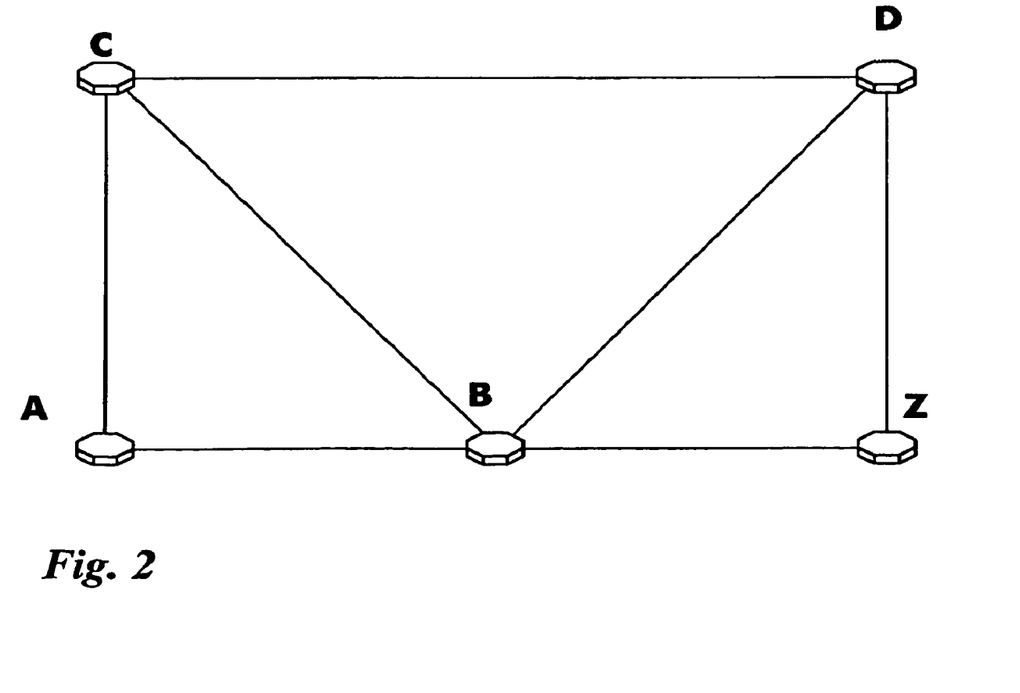
FIG. 2 shows an example network topology that is used in the embodiments.

The network topology that is used in the following examples is shown in FIG. 2. Five network elements A, B, C, D, and Z are mutually interconnected by bi-directional links. In particular, links exist between A-B, A-C, B-C, B-D, B-Z, C-D, and D-Z. It is assumed that for the below examples, all links are idle. All nodes are equipped with GMPLS extension and have all the same switching capabilities, i.e. HOVC, ODU1, and ODU2 on all ports. Each node can adapt any lower layer to any higher layer, e.g. HOVC to ODU1, HOVC to ODU2, and ODU1 to ODU2 independent of which port. The rules for adaptation are in the examples identical for each node and are not ambiguous. Therefore no specific signaling is required.

In the case a request for a new connection reaches for example network element A, its associated GMPLS controller determines a path to the end point of the requested connection, assume to network element Z. All GMPLS controllers store for this purpose information about the network topology, existing connections and their usage. This information is automatically updated and exchanged between the individual GMPLS controllers using the well known OSPF protocol. The algorithm that determines the best path is typically based on a calculation of costs per path and chooses the available path with the lowest costs, i.e. the path which is the "shortest" in terms of costs. The basic principle is that each link or "hop" has for the particular client layer assigned a certain cost value and the costs of a path are the sum over all link costs along this route. Hence, routing is performed on cost per link basis. The cost of a route may depend on different parameters such as:

hardware features of the links (copper wire, optical fiber, etc.);
path length (expressed in number of links);
link length (expressed for instance in number of repeaters for each lin);
usage percentage of the links in the path;
maintainability of the path;
reliability of the path; and
operator driven routing constraints such as VPNs and link coloring.

Existing algorithms can take only those paths into account where the underlying server layer connections already exist, which leads to sub-optimal results since the algorithm tends to adapt the client layer traffic to the existing server layer. In some cases, it is impossible to restore client traffic without establishing a new server layer connection. In other cases, it may for instance be "cheaper" to establish a new server layer connection between neighboring network elements rather than to use a long detour route over existing server layer connections.

The invention enhances this situation in that a single control plane (i.e. for HOVC, ODU1, ODU2 in the examples) is implemented, which allows to share reachability and capacity information among all nodes. This means that a source node is able to know all potential HOVC drop ports and links in the network although no server layer connection are yet available. Therefore, a source node is able to find a free path through the network independently of layers involved.

In the first embodiment, switching within the network is performed on client layer level, i.e., HOVC is switched on HOVC level at each hop between source and destination, ODU1 on ODU1 level and so on. As a general rule, if no server layer resources to the next hop are already provisioned, the smallest server level container will be used. This rule serves to avoid a need to negotiate the type of a server layer connection to be created. It should be clear, however, that any other predefined rule can be used instead or the server layer connection type can be negotiated.

According to the invention, routing is performed on cost per link basis but it is taken into account that also higher layer capacity is available for lower layer connections. In other words, the algorithm pretends that server layer connections were available even if not yet existing. Routing information is based on available capacity per layer. As long as only links are selected for a path, where server layer connections with idle capacity already exist, no additional costs arise but the costs are the same as in existing least cost routing algorithms. In other words, as long as the algorithm stays within one layer, the normal costs as in the prior art routing algorithms are calculated. However, according to the present invention, additional costs are associated to the creation of a new server layer connection, e.g., a cost penalty of X. This cost penalty applies for a server layer connection in a next higher layer, e.g., the creation of an ODU1 for an HOVC. For the creation of a multiple server connection on multiple server layere, i.e., which traverses more than only one layer, e.g., ODU2 and ODU1 for HOVC, the cost penalty will be Xn.

According to the invention, link costs depend thus on the type of connection to be established. For instance a lower layer connection is requested and a higher layer server connection must be established first, the costs are higher by the cost penalty as in the case that the higher layer connection is requested directly. In the latter case, the cost penalty would not apply.

It should be noted that the cost penalty values according to the invention can be assigned by the operator and serve to steer creation of new server layer connections. A strict layered routing would be achieved by setting X to an infinite value. In this case no server layer would be triggered when a client layer needs capacity. Conversely, if the cost value is set to zero, the shortest path is always used independent of how much server layer connections must be created and of how much resources are thus consumed by the client connection.

An additional rule is that if operator configured trails already exist, which we call "forwarding adjacencies", those shall be used by the routing algorithm in the first place since they are not subject to cost penalties described above because they exist already and need not be created anymore. Moreover, in the case that no server layer resources to the next hop are already available, the smallest available granularity shall be chosen in the server layer container. Hence, for a VC4 or a concatenation VC4-4c or VC4-16c will always be transported in an ODU1 but not directly in an ODU2, see FIG. 1.

Based on these rules, the first embodiment describes how connections can be set up using the example network topology of FIG. 2. Network element A receives a connection request for single VC4 from A to Z. The routing algorithm implemented in the GMPLS controller of network element A calculates a free path from A-Z based on routing information stored in its local routing base.

Figure 3:
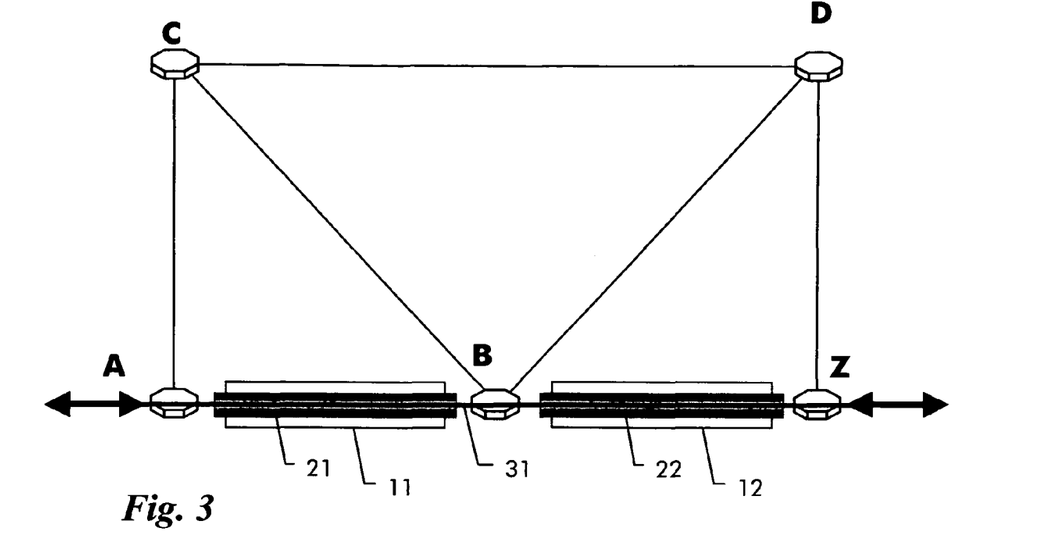
FIG. 3 shows a first automatically established client layer connection in a first embodiment.

Since no pre-provisioned server trails exist in the network of FIG. 2, each link has a cost of Xn resulting in a total cost of K*Xn (K=number of links). As a result, a path setup is created terminating ODU2 and ODU1 at each node along the connection while creating a path on VC4 level. The path is shortest based on link metrics, layering cost and nodes. After the ODU2 and ODU1 connections are established, a crossconnection is performed on HOVC level by network nodes A, B and Z to switch the HOVC through. This situation is shown in FIG. 3. Between network nodes A and B an ODU2 connection 11 and between network nodes B and Z an ODU2 connection 12 are created. These ODU2 connections are advertised as FA by their terminating nodes (A,B and B,Z) in the routing protocol (OSPF). Then, using the ODU2 connections 11, 12 as server layer, ODU1 connections 21, 22 are set up over the ODU2 connections 11, 12, respectively. These ODU1 connections are advertised as FAs by their terminating nodes (A,B and B,Z) in the routing protocol. Using these ODU1 connections 21, 22 as server layer, a HOVC connection 31 within an STM-16 frame is established and a crossconnection on VC4 level switched in end nodes A and Z and intermediate node B. An end-to-end VC4 connection exists thus between A and Z.

It should be noted at this point that creation of ODU2, ODU1, and HOVC level connection can also be performed in parallel at the same time, provided that alarms generated during the creation phase from lower layers, because their server layer is not yet ready, are suppressed so that these do not trigger restoration actions in the network.

Figure 4:
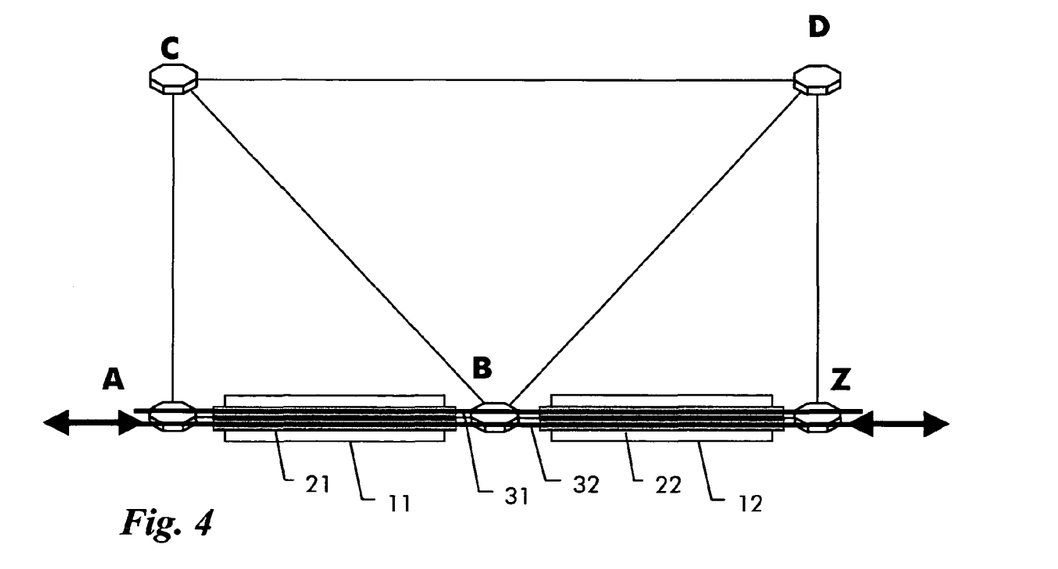
FIG. 4 shows in the first embodiment a second client layer connection established along the same route as the first client layer connection.

In a next step, a request arises for a second VC4 connection from network nodes A to Z and the GMPLS controller of network element A calculates another free path from A to Z based on routing information stored in its local routing base. Since ODU1 and ODU2 connections 11, 12, 21, 22 already exist between nodes A and B and nodes B and Z, respectively, and these connections are not yet completely filled, no additional link cost is required. As a result the second path uses exactly the same server layer resources as the path for HOVC 31. Network nodes A, B, and Z perform a crossconnection on HOVC level and the new HOVC connection 32 is thus established. This is shown in FIG. 4.

Now, a third request is received at network node C for a HOVC connection to node Z. The GMPLS controller of network element C calculates a free path from C to Z based on routing information stored in its local routing base. Via OSPF protocol, the routing base of node C is currently updated and aware of the server connections 11, 12, 21, and 22.

Figure 5:
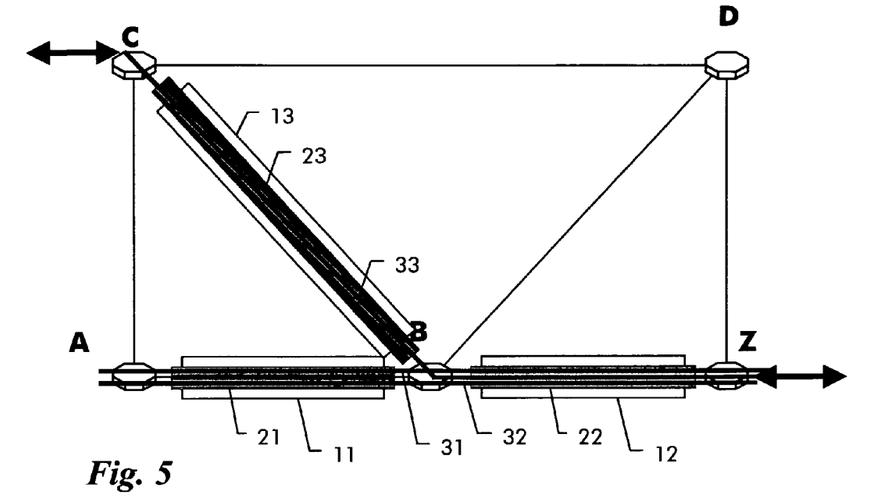
FIG. 5 shows in the first embodiment the automatic setup of a third client layer connection.
Figure 6:
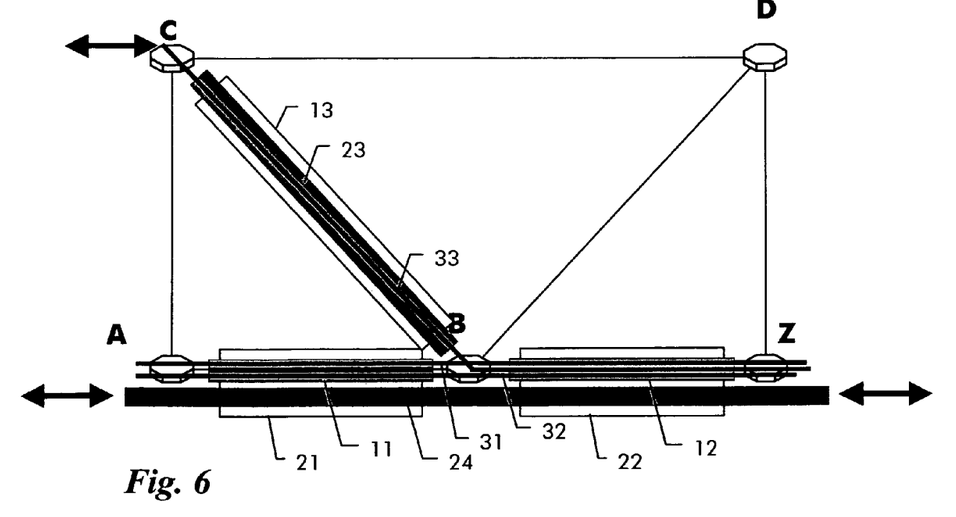
FIG. 6 shows in the first embodiment the creation of a new connection in a higher layer along the some route as the server layer connection used for the first client layer connection.

Since ODU1 and ODU2 connections 12, 22 are already existing between nodes B and Z and not filled, on a subsection of a path from C to Z server layer connections exist already. Therefore, no additional link cost is required for this part. A new server layer connection is hence created between nodes C and B at a cost of 1*Xn. For the subsection B-Z, the existing server layer connections are used. As a result the third path uses the same server layer resources as paths 31 and 32 between B-Z and a new server layer connection 13 on ODU2 layer and a new server layer connection 23 on ODU1 layer between C-B. A crossconnection is then performed on HOVC level in network nodes A, B, and Z to complete the HOVC connection 33. This situation is shown in FIG. 5.

Next, a fourth connection request requires a single ODU1 from A to Z. The GMPLS controller of network element A calculates a free path from A-Z based on routing information stored in its local routing base. Since ODU2 connections 11 and 12 already exist and are not filled, no additional link cost is required. As a result the fourth path uses exactly the same ODU2 layer resources as paths 31 and 32 and as partially path 33. Network elements A, B, and Z perform a crossconnection on ODU1 level and the ODU1 connection 24 is complete.

This first embodiment shows how connections can be set up based on locally available resources. As a conclusion, it can be noted that the above described method and routing algorithm is able to automatically trigger multi-layer connections in one shot based on costs. It consumes the minimum server layer resources when creating a client layer path based on costs and it automatically creates single hop server trails.

Further aspects of are now explained in a second embodiment, which uses the same network topology shown in FIG. 2.

The limitation of the first embodiment is that automatically created connections do not trigger multi-hop server trails but only single hop server trails. It is generally more efficient if multi-hop server trails, which we call forwarding adjacencies (FAs), are generated, but the policy to create them can become more complex. A simplified policy will be proposed below based on the expectation that an operator provisioned multi-hop forwarding adjacency is optimal.

A general rule of this improvement is that, if between a source and destination node A-Z a direct forwarding adjacency exists but which has no idle capacity, an additional server trail is created along the same links. Along these links the same cost metrics apply as described for the first embodiment. If the new server trail, however, cannot use the same route, different policies can be applied, for example:

The connection request is immediately rejected.

Link constraints corresponding to the existing forwarding adjacencies are ignored and an attempt is made to establish a server trail over any other available link.

The single hop-based policy from the first embodiment is applied.

A combinations of the above approaches would also be possible.

Figure 7:
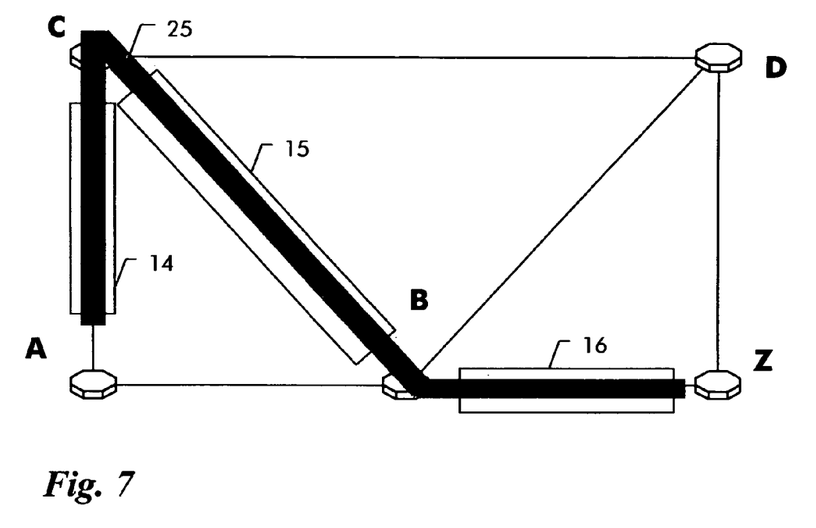
FIG. 7 shows in a second embodiment a preconfigured empty server layer connection.

In the second embodiment, it is assumed that an operator wants to allocate a specific ODU1 trail for HOVC connections between A-Z not following the shortest path. A connection request for single ODU1 from A via C and B to Z is hence issued. The end points within the nodes A and Z will be connected to HOVC switch fabric, respectively. The routing algorithm in the GMPLS controller of node A calculates a free path along the operator-defined route A-C-B-Z based on the available routing information. Since no ODU2 connections exist already (see FIG. 2), additional link cost X is required for each link along the route (total cost=k*X). Several single hop ODU2 segments will be created automatically to host the ODU1 trail. Finally, crossconnections are performed in nodes C and B on ODU1 level. The resulting ODU1 connection 25 and the ODU2 segments 14, 15, and 16 are shown in FIG. 7. A new HOVC connection has now to use the preconfigured server layer connection 25.

Figure 8:
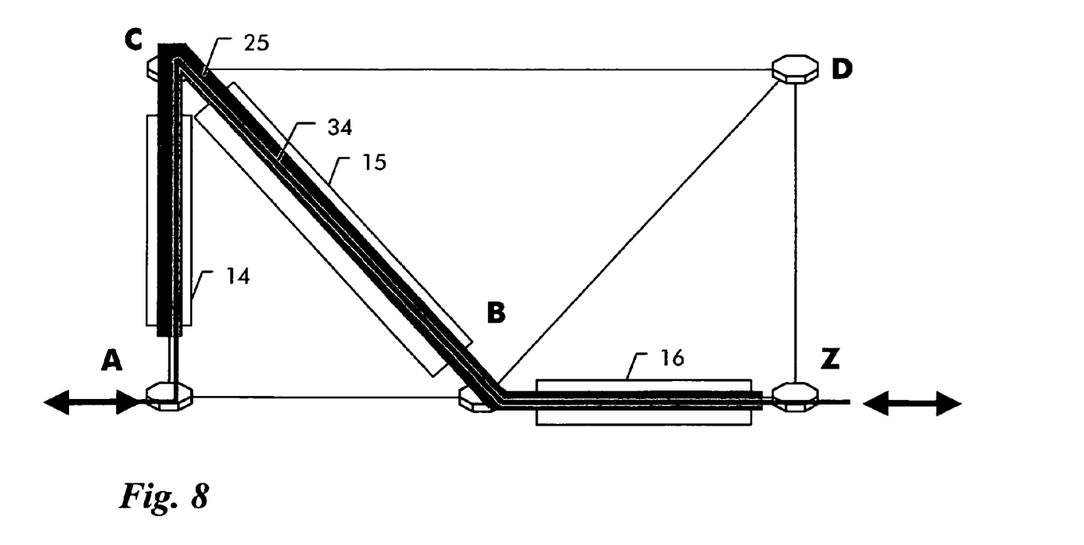
FIG. 8 shows provisioning of a new client layer connection along the preconfigured server layer connection in the second embodiment.

It is then assumed that a connection request for concatenation VC4-16c from A to Z occurs at network node A. The routing algorithm in the corresponding GMPLS controller calculates a free path from A-Z based on available routing information. Since ODU1 and ODU2 connections 25, 14, 15, 16 are already pre-provisioned (see FIG. 7) and not filled, no additional link cost is required. As a result the HOVC path will use exactly the pre-provisioned server layer resources of ODU1 connection 25 defined by the operator. Crossconnection need only be performed on HOVC level in network nodes A and Z. This situation is shown in FIG. 8.

Figure 9:
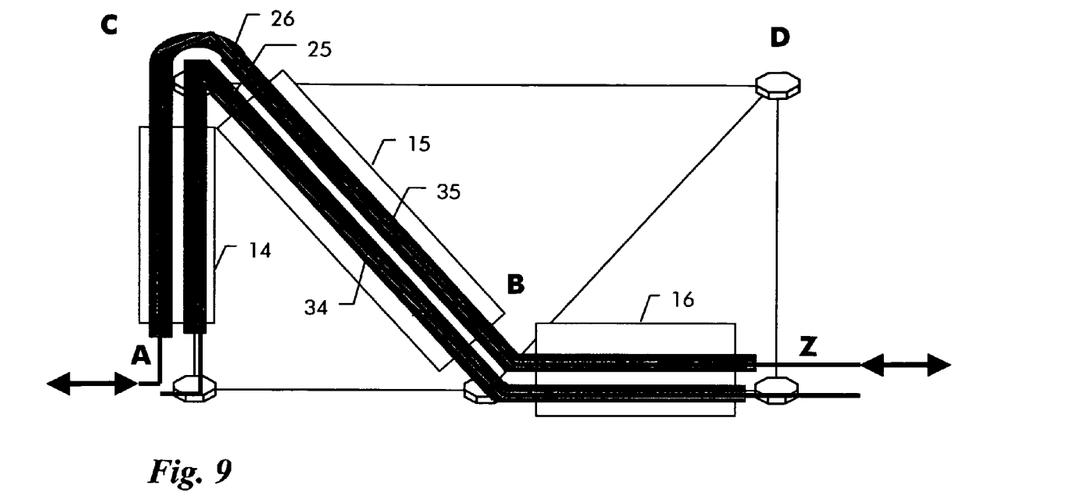
FIG. 9 shows automatic creation of a new server layer connection for a second client layer connection along the some route as the first client layer connection.

Finally, we assume a third connection request occurs for a second concatenation VC4-16c from A to Z. Again, the routing algorithm in the corresponding GMPLS controller calculates a free path from A-Z based on available routing information. A forwarding adjacency 25 from A-Z on ODU1 level exists but cannot be used since it is occupied. According to the improvement of the second embodiment, another ODU1 forwarding adjacency 26 is created using the same route as the existing one. The costs of the ODU2 connections 14, 15, 16 used by previous adjacency 25 are 0, since these connection exist already. As a result the new ODU1 trail 26 uses exactly the some server layer resources as defined by the provisioned ODU1 trail 25. Crossconnections are performed on ODU1 level in network nodes C and B to complete the forwarding adjacency 26. On HOVC level network nodes A and Z perform crossconnections and map the HOVC into the ODU1 trail 26 created. The new HOVC connection 26 is thus established.

The method and routing algorithm in the second embodiment is able to automatically trigger multi-layer connections in one shot based on costs and follows any pre-provisioned server layer trail as long as enough resources are available (=cheapest path). It consumes the minimum server layer resources when creating a client layer path based on costs and is able to create multi-hop server trails triggered on client request whenever pre-provisioned trails are exhausted. Moreover, auto-provisioned multi-hop server trails are optimal in the sense that they use the same resources as operator provisioned traffic-engineered forwarding adjacencies. By setting the cost to establish server layer trails to an infinite value, the auto-provisioning across layers can be tightly controlled.

It should be noted that the above described embodiments are only non-exhaustive examples of the invention, of which various modifications and alternatives would be apparent to those skilled in the art. For instance, instead of using existing forwarding adjacencies (FA) as 'pilot' for the establishment of automatic FAs, link coloring can be used. Link coloring is a mechanism in routing which allows to define some virtual topologies to constrain the path search algorithm. Colors are assigned by the operator per link and can be used as constraint e.g. as a rule to use only 'red' links to set-up a path. Colors can be assigned to forwarding types such that e.g. OTH links marked as 'red' can be used for automatic setup triggered by a client, while 'blue' links are not allowed to be used. This way, a source node will try to use only 'red' links for a path that requires to set up a server trail connection.

Another modification would be to allow dynamical cost penalties for layer transitions. For instance, a first creation of a server layer might be cheaper than a second creation and so on. A second or further layer transition may also be forbidden by setting the cost penalty for the second transition to an infinite value.

Figure 10:
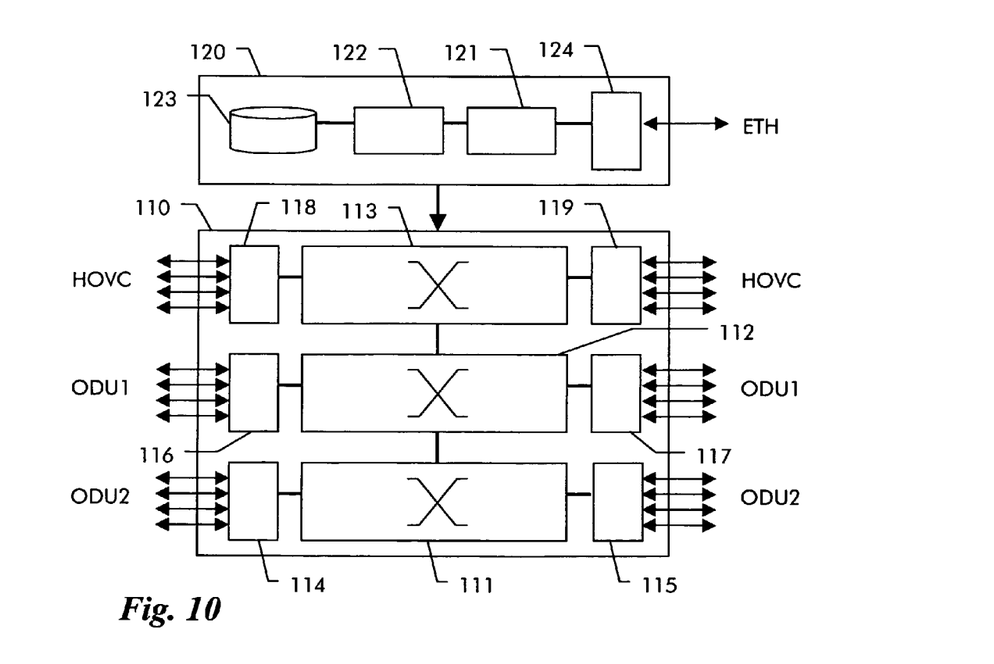
FIG. 10 shows a block diagram of a network element with GMPLS routing extension used in the example transport network.

For the sake of completeness, a schematic block diagram of a network element in a GMPLS-enhanced transport network is shown in FIG. 10. It consists of a multi-layer switch device 110 and a GMPLS control part 120. The switch device 110 contains an ODU2 switch fabric 111, an ODU1 switch fabric 112, an HOVC switch fabric 113, ODU2 interface boards 114, 115 with one or more ODU2 interfaces, ODU1 interface boards 116, 117 with one or more ODU1 interfaces and STM-N interface boards 118, 119 with one or more STM-N interfaces. The switch fabrics 111, 112, 113 are connected with the corresponding interface boards 114, 115, 116, 117, 118, 119, respectively, and are mutually interconnected to allow interconnections at all layers. The GMPLS controller 120 contains a processor 121, a RAM with a routing software, a routing base 123 storing routing and topology information about the network, and an Ethernet interface 124 for interfacing with other GMPLS controllers via a dedicated data network. The GMPLS controller controls switch fabric configuration and I/O configuration of the switch device 110.

It should be noted that various modifications to this general network element design would be apparent to those skilled in the art. For example the network element can serve only two levels of multiplexing or can serve other levels such as SDH LOVC and HOVC, or HOVC and Ethernet or any other suitable combinations of transport protocols. The network element can additionally have tributary signal interfaces, such as PDH (Plesiochronous Digital Hierarchy), ATM, Ethernet, or other data interfaces. Moreover, as would be apparent to those skilled in the art, the network elements include multiplexing and mapping functionality, which is incorporated into the I/O and/or matrix components.

The invention claimed is:

1. A method of setting up a client layer connection over at least one server layer connection in a multi-layer network, the method comprises the step of:

selecting a path through said multi-layer network, taking into account free resources of pre-existing server layer connections in the multi-layer network and additionally taking into account free resources in said multi-layer network, where no server layer connections exist so far;

the selection step being based on a cost calculation taking into account a cost value per link through the multi-layer network and further taking into account an additional cost value for links through the multi-layer network on which no available server layer connection exist so far, and wherein the selected path has the lowest overall cost;

the method further comprises the steps of establishing new server layer connections on links along said selected path where pre-existing server layer connection with free resources are not available, and establishing said client layer connection along said selected path over the pre-existing server layer connections and/or the new server layer connections;

wherein if pre-existing server layer connections exist, said selection step prefers such pre-existing server layer connections;

wherein if a pre-existing server layer connection exists but does not provide sufficient resources to establish said client layer connection, a new server layer connection is established and is used for said client layer connection;

wherein the new server layer connection is established over a same route as the pre-existing server layer connection that does not provide the sufficient resources.

2. A method according to claim 1, wherein server layer connections are established on several hierarchical layers to provide the resources for said client layer connection.

3. A method according to claim 1, wherein if at least two options to multiplex client layer connections onto pre-existing server layer connections exist, said selection step uses the option which supports the smallest multiplexing entity.

4. A method according to claim 1, wherein affected network elements of the multi-layer network along said selected path perform switching of a multi-layer switch device on the level of said client layer.

5. A method according to claim 1, wherein said cost values are assigned by an operator of said multi-layer network.

6. A method according to claim 1, wherein said additional cost value is set dynamically.

7. A method according to claim 6, wherein an additional cost value for a second creation of a server layer is higher than a cost value for a first creation of a server layer.

8. A method according to claim 1, wherein different link colors are assigned to at least some of said links and wherein said selection step considers only links from a subset of said link colors.

9. A controller for a network element of a multi-layer network, said controller comprising:
  a processor for running a routing algorithm,
  a storage for storing said routing algorithm,
  a routing base for storing routing information about said multi-layer network, and
  a data interface for exchanging said routing information with other controllers in said multi-layer network;
  wherein said routing algorithm is programmed to perform, upon a request for a client layer connection, a selection of a path through said multi-layer network taking into account free resources of pre-existing server layer connections in the multi-layer network and additionally taking into account free resources in said multi-layer network, where no server layer connections exist so far;
  said selection being based on a cost calculation taking into account a cost value per link through the multi-layer network and further taking into account an additional cost value for links through the multi-layer network on which no available server layer connection exist so far, and wherein the selected path has the lowest overall cost;
  wherein if pre-existing server layer connections exist, said selection step prefers such pre-existing server layer connections;
  wherein said routing algorithm is programmed such that if a pre-existing server layer connection exists but does not provide sufficient resources to establish said client layer connection, it triggers a set-up of a new server layer connection and uses said new server layer connection for said client layer connection;
  wherein said routing algorithm is programmed to establish said new server layer connection over a same route using same server layer resources as are used for said pre-existing server layer connection.

10. A method of setting up a client layer connection over a multi-layer network, wherein the multi-layer network comprises a plurality of nodes interconnected by one or more links with corresponding link cost values, the method comprising the steps of:
  selecting a path through the multi-layer network with a lowest overall cost for the client layer connection, wherein the selected path comprises one or more links of the multi-layer network; and
  establishing the client layer connection along the one or more links of the selected path;
  wherein the step of selecting the path comprises the step of:
    selecting the path with first links for the path that comprise pre-existing server layer connections with sufficient idle capacity for the client layer connection;
    selecting the path, if insufficient resources from the first links are available, with second links for the path that comprise pre-existing server layer connections without sufficient idle capacity for the client layer connection; and
    selecting the path with third links for the path that comprise links without pre-existing server layer connections;
  wherein the step of establishing the client layer connection comprises the steps of:
    establishing a new server layer connection over a second link that comprises a pre-existing server layer connection without sufficient idle capacity for the client layer connection;
    establishing the client layer connection over the new server layer connection.

11. The method of claim 10, wherein the step of selecting the path comprises the step of:
  calculating an overall link cost for a link based on the link cost value and based on a penalty cost value for links without a pre-existing server layer connection;
  calculating the overall cost based on a sum of the overall link costs for the links of the selected path.

* * * * *